June 3, 1947. W. O. SCHULTZ 2,421,718
PROTECTIVE EQUIPMENT FOR CIRCUIT MAKERS AND BREAKERS
Filed May 20, 1944 3 Sheets-Sheet 1

INVENTOR.
WILLIAM O. SCHULTZ
BY Chester W. Brown
ATTORNEY.

June 3, 1947.　　　W. O. SCHULTZ　　　2,421,718
PROTECTIVE EQUIPMENT FOR CIRCUIT MAKERS AND BREAKERS Filed May 20, 1944　　　3 Sheets-Sheet 2

INVENTOR.
WILLIAM O. SCHULTZ
BY Chester W. Brown
ATTORNEY.

June 3, 1947.　　　　W. O. SCHULTZ　　　　2,421,718
PROTECTIVE EQUIPMENT FOR CIRCUIT MAKERS AND BREAKERS
Filed May 20, 1944　　　3 Sheets-Sheet 3
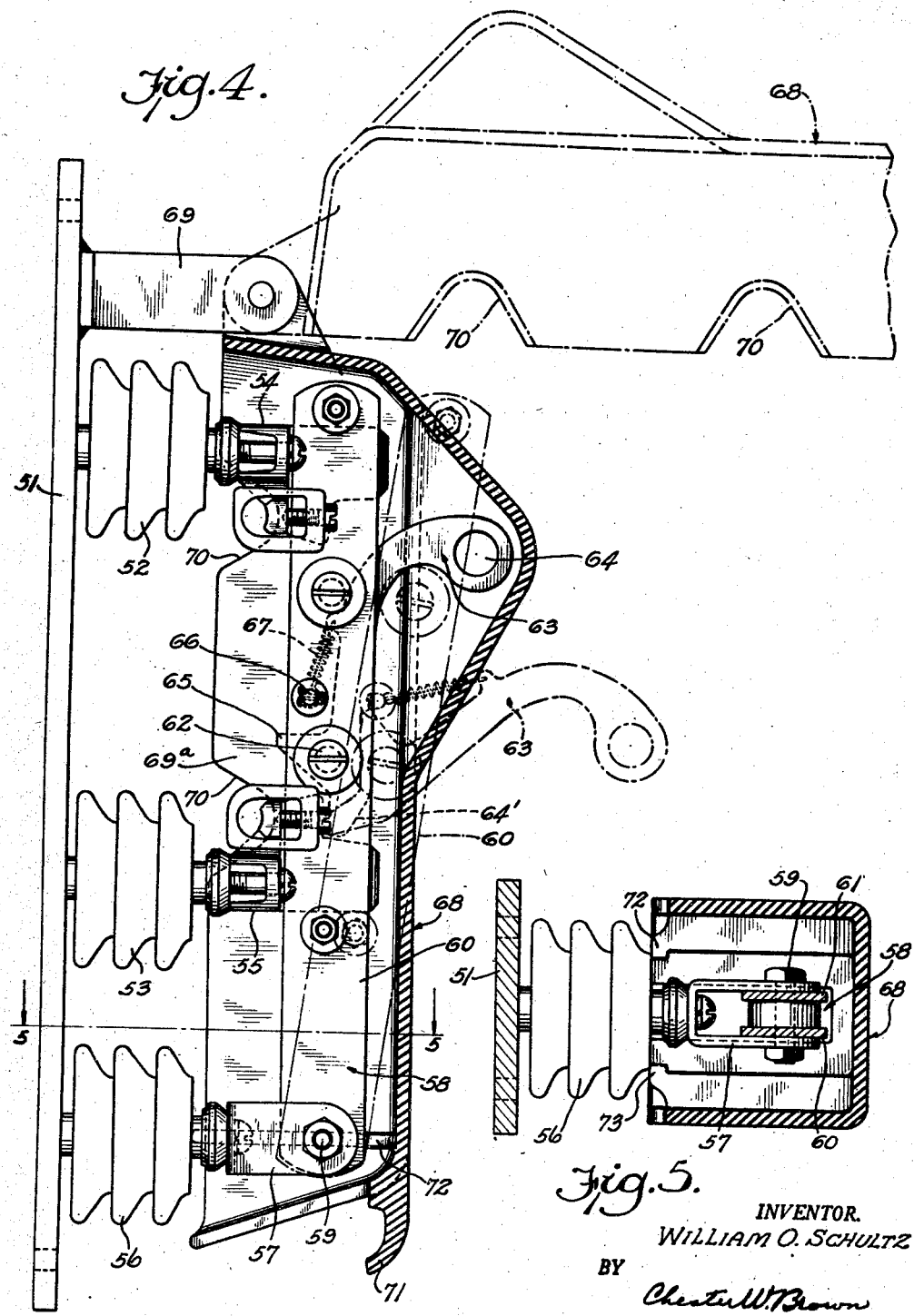
INVENTOR.
WILLIAM O. SCHULTZ
BY
Chester W. Brown
ATTORNEY.

Patented June 3, 1947

2,421,718

UNITED STATES PATENT OFFICE 2,421,718

PROTECTIVE EQUIPMENT FOR CIRCUIT MAKERS AND BREAKERS

William O. Schultz, South Milwaukee, Wis., assignor to Line Material Company, Milwaukee, Wis., a corporation of Delaware Application May 20, 1944, Serial No. 536,521

5 Claims. (Cl. 200—162)

This invention relates to improvements in protective equipment for circuit makers and breakers.

Circuit makers and breakers now in common usage may be generally considered as of two types, namely, the open type in which all electrically live parts are exposed and the enclosed type in which all electrically live parts are concealed by insulating materials.

In the open type, live parts may be accidentally contacted by a workman—this type is obviously dangerous—and also are subject to weather conditions, such as sleeting, when placed out of doors. In the enclosed type, live parts are not, under normal operating conditions, easily contacted by a workman and are protected against weather conditions.

From the standpoint of simplicity of design and maintenance, the open type may be considered superior to a comparative enclosed type. In breakers of the enclosed type, a limit to the size of the breaker is dictated by reason of the added cost and weight which is involved in housing the live parts. Consequently, such larger breakers are generally of the open type.

A primary object of this invention is to provide protective equipment for circuit makers and breakers which will retain the desirable features of the open type and embody the desirable features of the enclosed type, thereby largely eliminating the undesirable features of both types.

More specifically, it is an object of this invention to provide protective equipment which may be incorporated into the open type circuit maker and breaker without radical change in the design of the latter, but reducing to a minimum the possibility of injury to a workman through accidental contact with live parts and shielding the live parts from weather conditions, such as sleeting.

A further object is to provide protective equipment which is simple in design, light in weight, compact, easily formed to accurate dimensions, and arranged to eliminate substantially all current leakage across the protective equipment.

Porcelain has heretofore been considered as the most desirable material for housing live parts of a circuit maker and breaker, since it offers the best insulation between such live parts and between such parts and ground. Other materials, such as plastics, have not been used because they permit leakage of electrical currents which cause carbonization of the materials, ultimately resulting in flashovers.

While porcelain is most desirable for insulating purposes, it is nevertheless, extremely heavy, whereas plastics, such as "Bakelite" for the same comparative mechanical strength is much lighter and also is adapted for more accurate dimensioning.

For the reasons noted, it has not heretofore been found desirable to house circuit makers and breakers in materials other than porcelain and, consequently, comparatively heavy structures were necessary.

Therefore, another object of this invention is to provide protective equipment which is light and durable and at the same time not subject to undesirable leakage and resultant flashover.

In the accompanying drawings:

Fig. 4, is a side view in vertical elevation, partly in section, illustrating a modified embodiment of my invention.

Fig. 5 is a sectional view taken on the line 5—5 of Fig. 4.

Figure 1:
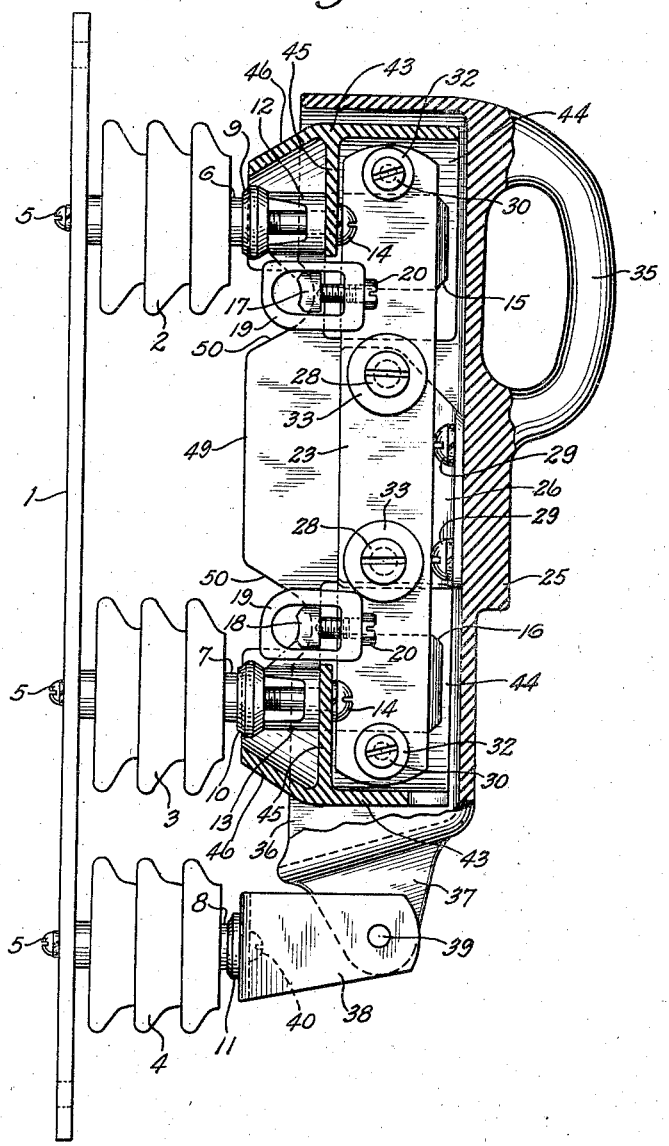
Fig. 1 is a side view in vertical elevation, partly in section, illustrating an embodiment of my invention.
Figure 2:
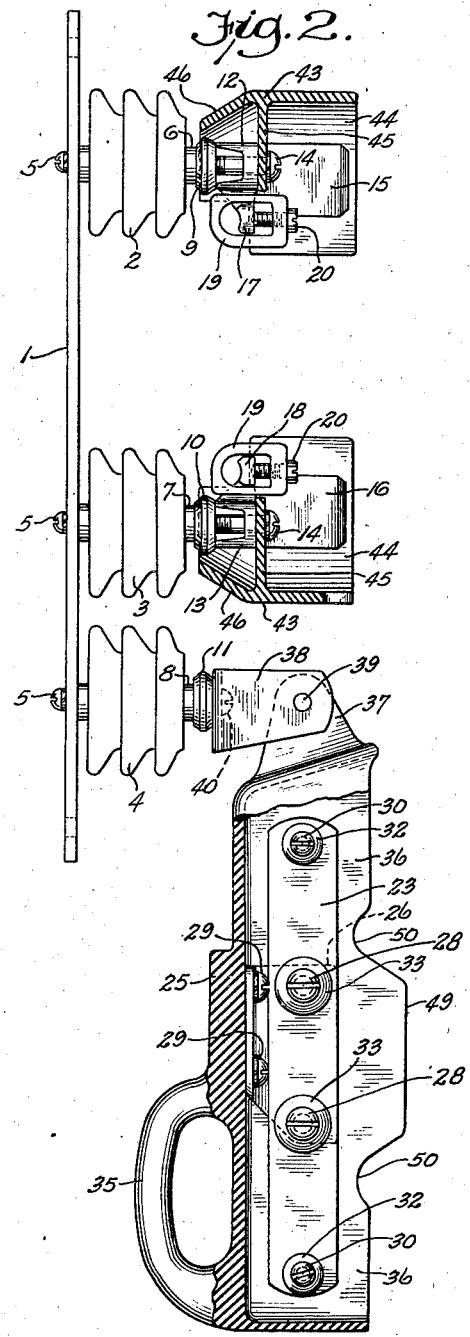
Fig. 2 is a side view similar to Fig. 1, but on a reduced scale, showing the switch in open position.
Figure 3:
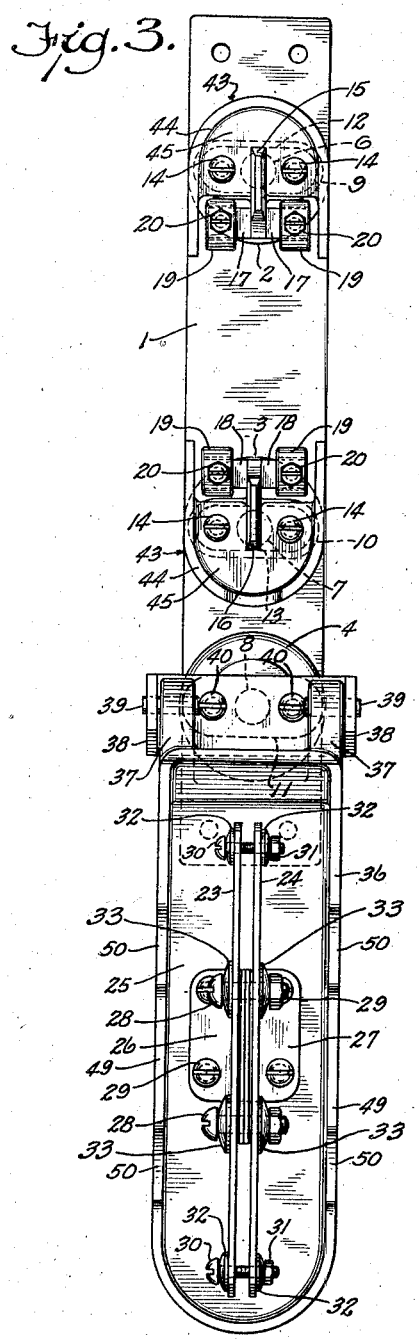
Fig. 3 is a view taken from the right, relative to Fig. 2.

The circuit maker and breaker illustrated in Figs. 1 through 3, comprises a base 1 of any suitable design for mounting upon a supporting structure, relatively spaced petticoat insulators 2, 3, and 4 (preferably porcelain) secured to the base in any desirable manner, as by screws 5, mounting posts 6, 7, and 8 suitably secured to the insulators and having flat elongated ends 9, 10, and 11, and terminal members 12 and 13 secured respectively to the posts 6 and 7 by means of bolts 14 threadably engaging the ends 9 and 10 of the posts 6 and 7.

The terminal members 12 and 13 are each respectively provided with centrally located flat contacts 15 and 16, oppositely projecting wire clamping arms 17 and 18, movable wire clamping jaws 19 embracing the arms 17 and 18, and clamping bolts 20 engaging the arms 17 and 18 for actuating the jaws 19.

A switch blade comprising relatively spaced flat bars 23 and 24 normally bridges the contacts 15 and 16 and is carried by the cover 25, the bars 23 and 24 being secured to the cover in spaced relation by means of angle plates 26 and 27 to which they are attached by bolts 28 which in turn are attached to the cover by screws 29.

The corresponding ends of the bars 23 and 24 are connected by bolts 30 having nuts 31 which may be adjusted to vary the pressure with which the bars will engage the contacts 15 and 16, resilient washers 32 being provided to allow for lateral adjustment of the bars as the contacts are engaged. Similar washers 33 are provided for permitting lateral movement of the intermediate portions of the bars.

The cover 25 is provided with a handle 35 for normally operating the switch blade to open or closed position and comprises a box-like structure having a wall 36 surrounding the switch blade and provided with coaxially apertured ears 37 positioned within the U-shaped bracket 38 and pivotally mounted thereon by pivot pins 39. The bracket 38 is secured to the post 8 by means of screws 40 threadably engaged with the elongated end 11 on the post.

It is preferable, though not essential, that each terminal 12 and 13 be individually provided with an insulating shield 43 having a wall 44 surrounding the corresponding contacts 15 and 16 upon three sides and open toward the other to receive the switch blade. Each shield is also provided with a bottom 45 through which the corresponding contacts 15 and 16 project and which are secured to the terminals by means of the bolts 14. As an additional protection, each shield 43 is provided with a skirt 46 surrounding the corresponding post ends 9 and 10.

It will be noted that the wall 36 on the cover 25 projects on each side at 49 to further isolate the space between the insulators 2 and 3 and is notched at 50 to permit wires, not shown, to extend to the clamping arms and jaws upon the terminals 15 and 16.

When the switch blade is in closed circuit position as shown in Fig. 1, the cover 25 surrounds the blade, terminals, and shields and thus prevents accidental contact with live parts and also serves to adequately guard the contacts and blade against an accumulation of sleet. When the switch is in open circuit position, see Figs. 2 and 3, the shields 43 afford a measure of protection against accidental contact which is to a considerable degree comparable to the protection in so-called housed switches.

In Fig. 4 another form of my protective cover is applied to a different type of circuit maker and breaker.

The switching mechanism is the same as that disclosed in the United States Letters Patent No. 2,301,462 granted to William O. Schuitz and Alwin G. Steinmayer on November 10, 1942, and assigned to the assignee of the present application. It comprises a supporting structure 51, relatively spaced insulators 52 and 53 mounted thereon, a pair of terminals 54 and 55 carried by insulators, and a third spaced insulator 56 to which is secured the switch blade support 57.

A switch blade 58 is pivoted at its lower end on the support 57 by means of the bolt 59. The switch blade comprises two bars 60 and 61 which engage the contact portions of the terminals 54 and 55 when the switch is in normally closed position.

Pivotally carried by bolt 62 and between the bars 60 and 61 is a switch operating lever 63 comprising a pull-ring 64 extending from between the bars, a cam finger 64', and a stop finger 65 engageable with the pin 66 which extends through the bars 60 and 61. A coil spring 67 is engaged at one end with pin 66 and at the other end with a lug on lever 63. To open the switch, pull-ring 64 is engaged by a switch stick, not shown, and moved in a clockwise direction.

The protective cover 68 is pivotally carried at its upper end by a stanchion 69 which is firmly attached to the main supporting structure 51 in any suitable manner. The cover 68 is made of "Bakelite" or similar plastic and comprises a box-like structure having a wall 69a, surrounding the switch blade, and notches 70 to allow conductors, not shown, to extend to the clamping arms and jaws of the terminals 54 and 55 without contacting the cover 68. The bottom wall of the cover 68 has a slotted portion which is adapted to fit over the switch blade 58 when in open position. A finger 71, which is engageable to open the cover 68, projects from the lower end of the cover.

At the lower interior end of the cover 68 are two legs 72 and 73 which, for a greater part of their length, are integral with the interior side walls of the cover and which horizontally project from the cover so as to contact the insulator 56, as clearly shown in Fig. 5, and which act as stops to prevent the cover 68 from contacting any live parts of the switch or of the live wires leading to the switch.

While "Bakelite" and other plastics of a similar character have many qualities which make them desirable for housing circuit makers and breakers; for example, their light weight, compactness, adaptability for more accurate dimensioning, and their good dielectric quality; they, nevertheless, have an undesirable feature in that they present leakage paths between live parts and between such parts and ground. Through my invention I have made possible the use of "Bakelite" and similar plastics for protective housings without any accompanying disadvantage. In a large measure this is due to the manner that I have provided for mounting the housing. It is mounted so that it never bridges live parts or high potential terminals, or an energized part and a part which leads to ground.

From the foregoing description it is evident that I have provided a housing of simple design, adaptable to a standard circuit maker and breaker of any design, which adequately protects workmen from accidental contact with any energized parts.

It is intended that my protective housing be adaptable to practically any type of circuit maker and breaker and is not to be limited to the types herein shown, which comprise no part of my present invention and are merely shown here for the purpose of illustration.

What I claim is:

1. In a circuit maker and breaker comprising a supporting structure including a pair of spaced insulators and a pair of fixed contacts individually carried by each of said insulators, said contacts normally bridged by a hinged conductive member, a protective housing comprising a box-like cover of non-conductive material pivotally carried by said supporting structure, independent of said contacts and conductive member, said cover being recessed to receive said contacts and conductive member, whereby said recessed cover shelters said contacts and conductive member and shields them from accidental contact, the hinges of said member and cover being relatively positioned at opposite ends of said structure and affording movement of said member and cover to open positions in relatively opposite directions.

2. In a circuit maker and breaker comprising a supporting structure including a pair of spaced insulators and a pair of fixed contacts individually carried by each of said insulators, a switch blade normally bridging said fixed contacts, a protective housing comprising a box-like cover of dielectric material pivotally supported by a pair of arms carried by said main supporting structure, independent of said contacts, an insulator interposed between said arms and said main supporting structure, said switch blade being mounted on said protective cover interiorly thereof, said cover being recessed to receive said pair of contacts, the arrangement of parts being such that when said cover is closed said switch blade is in circuit closing position, said protective cover being mounted so that when in closed position it normally protects said spaced contacts and switch blade against accidental contact from front, sides, top, and bottom, a pair of shield members of dielectric material, each carried individually by one of said insulators and each partially encircling one of said contacts whereby to provide a substantial amount of protection against accidental contact with said contacts when said switch blade is open.

3. In a disconnect switch comprising a supporting structure including a pair of spaced insulators and a pair of fixed contacts individually carried by each of said insulators, a third insulator in alignment with said pair of spaced insulators, said third insulator pivotally carrying a switch blade which normally bridges said spaced contacts when in closed position, a protective housing comprising a deeply recessed cover of dielectric material pivotally carried by said supporting structure independent of said contacts and blade, said recessed cover receiving said contacts and blade and shielding them from accidental contact, a stop means at the lower end of said recessed cover and projecting therefrom, said stop means co-operating with said third insulator to prevent said cover from contacting any energized portions of said disconnect switch.

4. In a circuit maker and breaker comprising a support including three spaced insulators and a pair of fixed contacts individually carried by each of the upper two insulators, a switch blade pivotally connected at its lower end to the lowermost of said insulators and movable about its pivotal connection to engage and disengage said contacts, a protective housing comprising a box-like cover of dielectroic material hinged at its upper end to said main support independent of said circuit maker and breaker, a pair of legs at the lower interior end of said cover integrally cast with said cover and projecting horizontally therefrom, said pair of legs being spaced apart so as to straddle said circuit maker and breaker without contacting any portion thereof, said pair of legs co-operating with said lowermost insulator to act as a stop means for said cover, said legs being arranged so they contact said insulators when said cover is in closed position, whereby said cover is prevented from contacting any live portions of said contacts and blade when in closed position, said cover forming a protective barrier at the front, sides, top, and bottom of said contacts and blade and shielding them against accidental contact.

5. In a disconnect switch comprising a supporting structure including a pair of spaced insulators and a pair of fixed contacts individually carried by each of said insulators, a third insulator in alignment with said pair of spaced insulators, said third insulator pivotally carrying a switch blade which normally bridges said spaced contacts when in closed position, a protective housing comprising a deeply recessed cover of dielectric material pivotally carried by said supporting structure independent of said contacts and blade, the pivots of the blade and housing being relatively positioned at opposite ends of said structure and affording movement of said blade and housing to open positions in relatively opposite directions, said recessed cover receiving said contacts and blade, and stop means to prevent said cover from contacting any energized portions of said disconnect switch.

WILLIAM O. SCHULTZ.

REFERENCES CITED

The following references are of record in the file of this patent:

UNITED STATES PATENTS

| Number | Name | Date |
| --- | --- | --- |
| 598,553 | Andersen | Feb. 8, 1898 |
| 876,910 | Perkins | Jan. 14, 1908 |
| 1,465,878 | Stanger | Aug. 21, 1923 |
| 2,091,452 | Ransey | Aug. 31, 1937 |
| 2,314,661 | Rawlins | Mar. 23, 1943 |
| 1,656,399 | Steinmayer | Jan. 17, 1928 |